United States Patent [19]

Sumiya et al.

[11] Patent Number: 4,724,745
[45] Date of Patent: Feb. 16, 1988

[54] HYDRAULIC SERVO DRUM FOR FRICTION CLUTCH

[75] Inventors: Koji Sumiya, Nishio; Takenori Kano, Anjo; Yutaka Taga, Aichi; Kazuaki Watanabe, Toyota, all of Japan

[73] Assignees: Aisin-Warner Limited, Anjo; Toyota Jidosha Kabushiki Kaisha, Toyota, both of Japan

[21] Appl. No.: 763,004

[22] Filed: Aug. 6, 1985

[30] Foreign Application Priority Data

Aug. 8, 1984 [JP] Japan ................... 59-166959

[51] Int. Cl.⁴ .............. F16D 19/00; F16D 25/06; B23P 16/00
[52] U.S. Cl. .......................... 92/107; 92/128; 92/169; 29/156.4 WL; 192/70.2; 192/85 AA; 228/173.3; 228/173.4
[58] Field of Search .............. 92/107, 169.1, 128; 192/85 AA, 70.19, 70.2; 29/156.4, 515, 516; 228/173.3, 173.4, 173.6, 184

[56] References Cited

U.S. PATENT DOCUMENTS

| 1,703,037 | 2/1929 | Heck | 29/516 X |
| 2,670,828 | 3/1954 | McFarland | 192/85 AA X |
| 2,876,881 | 3/1959 | Parrett | 192/85 AA X |
| 3,902,746 | 9/1975 | Brandt | 29/516 X |
| 4,541,515 | 9/1985 | Nishimura et al. | 192/85 AA |

FOREIGN PATENT DOCUMENTS

| 57-76327 | 5/1982 | Japan | 192/85 AA |
| 57-90406 | 6/1982 | Japan | 92/169 |

Primary Examiner—Robert E. Garrett
Assistant Examiner—George Kapsalas
Attorney, Agent, or Firm—Spencer & Frank

[57] ABSTRACT

Described herein is a hydraulic servo drum which is compact in construction and defines an appropriate area for a piston, the servo drum including: an annular plate member having a press-formed cylindrical portion around the outer periphery thereof; an intermediate cylinder member having one end thereof fitted on the cylindrical portion of the annular plate member and formed with a spline in the remaining portions; and an outer cylinder member provided with a folded portion at one end thereof and having the inner periphery of the folded portion connected to the intermediate cylinder member.

2 Claims, 5 Drawing Figures

HYDRAULIC SERVO DRUM FOR FRICTION CLUTCH

BACKGROUND OF THE INVENTION (i) Field of the Invention

This invention relates to a hydraulic servo drum for friction clutches of vehicular automatic transmissions.

(ii) Description of the Prior Art

Generally, a hydraulic servo drum for friction clutches consists of an outer cylinder portion with an inner spline on the inner periphery thereof, an inner cylinder portion having a ring groove formed on the outer periphery thereof for fixing a retainer ring for the return spring of the hydraulic servo piston and provided with an oil passage for supplying line pressure to the hydraulic servo, and an annular plate portion connecting the outer and inner cylinder portions with each other and formed integrally with these cylinder portion by casting, coupling and releasing the hydraulic servo drum of a friction clutch relative to another component part by supplying or draining the line pressure.

In a case where a servo drum of such a construction is used for a friction clutch C2 which is operated at the time of shifts between the second and third speeds, however, the so-called shift shocks occur upon engagement and release of the clutch. In order to minimize the shift shocks, it is necessary to provide an appropriate piston area. In addition, the friction members (clutch plates) which are splined with the outer peripheral cylindrical portion vary in size and number depending upon the type of the vehicle. It follows that the hydraulic servo drum of the friction clutch, which is cast in the form of an integral structure, has to be remodeled almost in its entirety to cope with the change in size or number of the clutch plates, lacking versatility in practical applications.

SUMMARY OF THE INVENTION

It is therefore an object of the present invention to provide a hydraulic servo drum for friction clutch, which can define an appropriate piston are and which is improved in versatility as well as productivity.

It is another object of the invention to provide a hydrualic servo drum of the sort mentioned above, which requires only a change of an intermediate cylinder member in case of a change in the number or size of the clutch plates.

According to the invention, the hydraulic servo drum for friction clutch includes: as shown in FIG. 1, an annular plate member 2 having a press-formed cylindrical portion 2b around its outer periphery 2a; an intermediate cylinder member 3 having one end 3a fixedly fitted on the cylindrical portion 2b and formed with a spline 3g in the other portion 3b; an outer cylinder member 4 press-formed into a cylindrical shape and connected to the intermediate cylinder member 3 on the inner periphery of a folded portion 4b; the annular plate member 2, intermediate cylinder member 3 and outer cylinder member 4 being overlapped and welded at one end to form an overlapped portion 5.

The hydraulic servo drum for a friction clutch, according to the present invention, has the following advantages.

The hydraulic servo drum according to the invention is constituted by three parts, i.e., an annular plate member with a cylindrical portion, an intermediate cylinder member with a spline to be engaged, for example, with a clutch plate of a friction clutch C2, and an outer cylinder member, so that;

(a) It is possible to define an appropriate piston area and therefore to employ clutch plates of a large size despite reduction in diameter of the annular plate member, permitting easy alterations in the number or size of the clutch plates;

(b) The hydraulic servo drum construction can be used for other friction clutches; and (c) A hydraulic servo drum of a friction clutch can be fabricated by one welding operation, enhancing the productivity in the manufacturing process.

The above and other objects, features and advantages of the invention will become apparent from the following description and the appended claims, taken in conjunction with the accompanying drawings, which show by way of example one preferred embodiment of the invention.

DESCRIPTION OF THE PREFERRED EMBODIMENT

Figure 1:
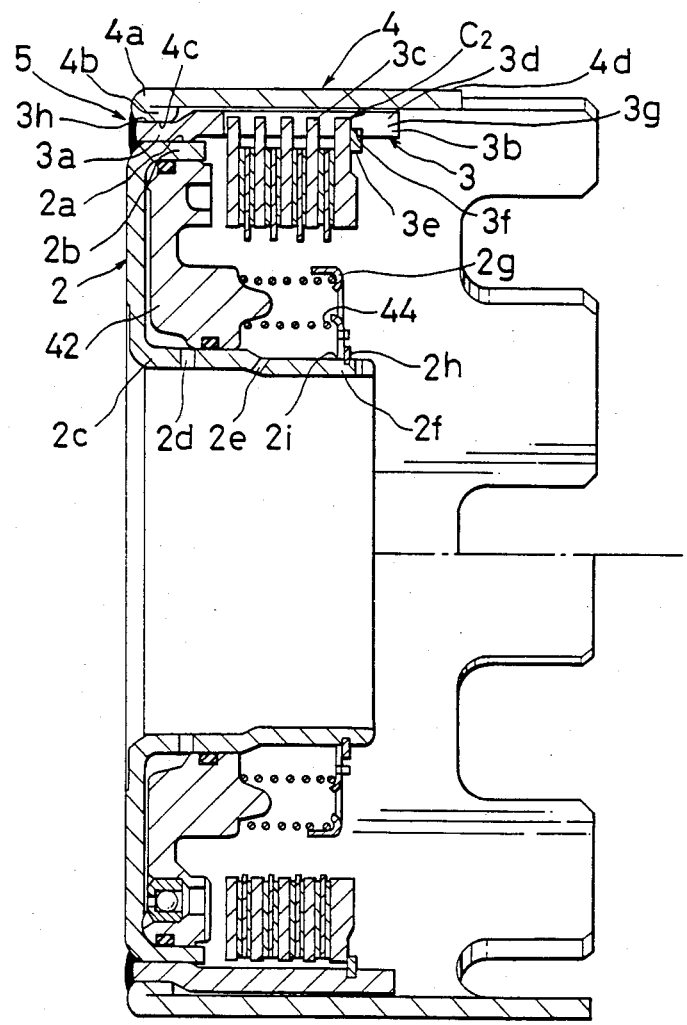
FIG. 1 is a sectional view of a hydraulic servo drum for a friction clutch, embodying the present invention.

Now, the hydraulic servo drum according to the invention is described more particularly by way of a preferred embodiment shown in the drawings.

In the particular embodiment shown, the hydraulic servo drum of the invention is applied as a second hydraulic servo drum of a friction clutch C2 of a vehicular automatic transmission.

Figure 2A:
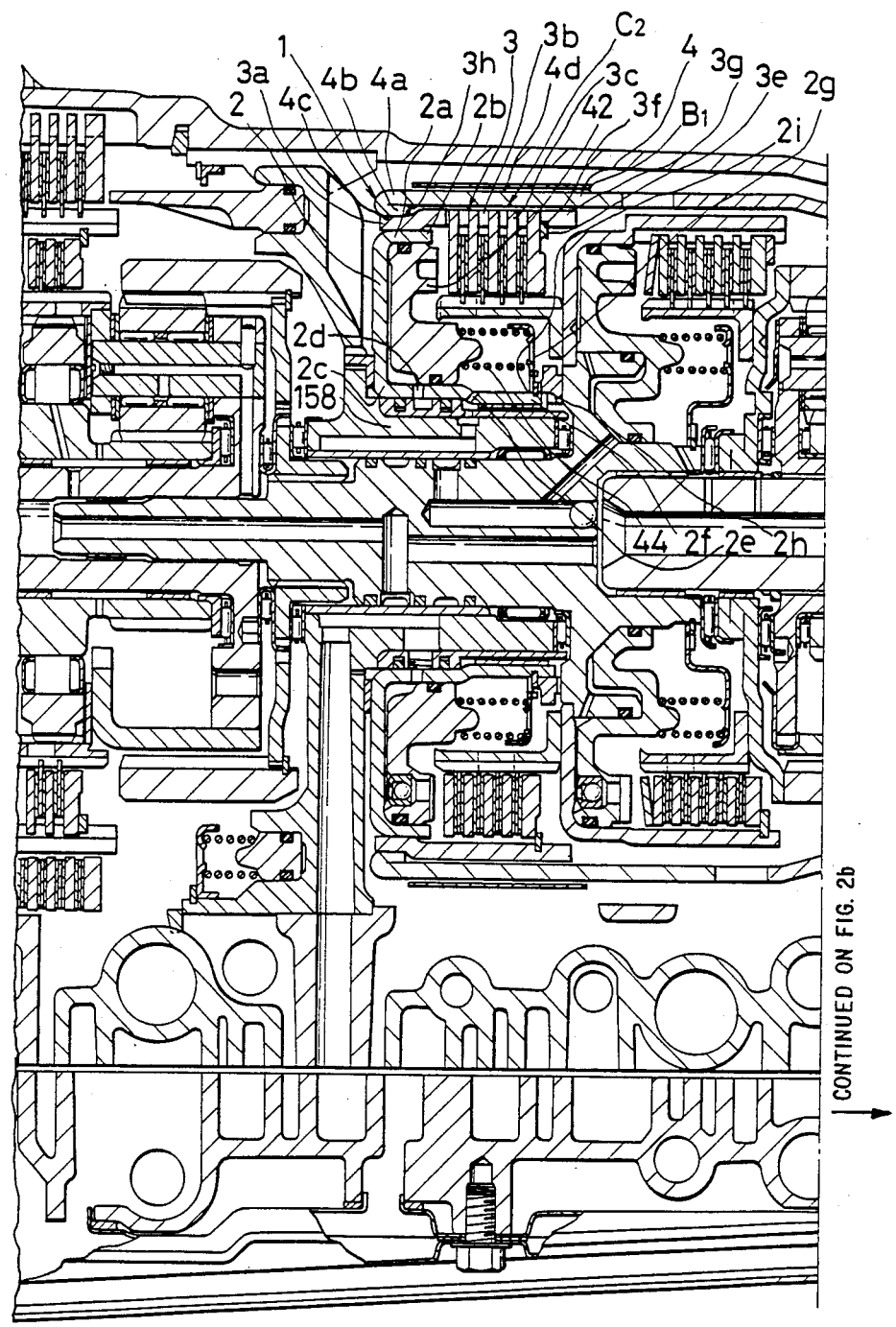
FIGS. 2a and 2b are sectional views of the left and right half, respectively, of a main component assembly of a vehicular automatic transmission incorporating the hydraulic servo drum according to the invention.
Figure 2B:
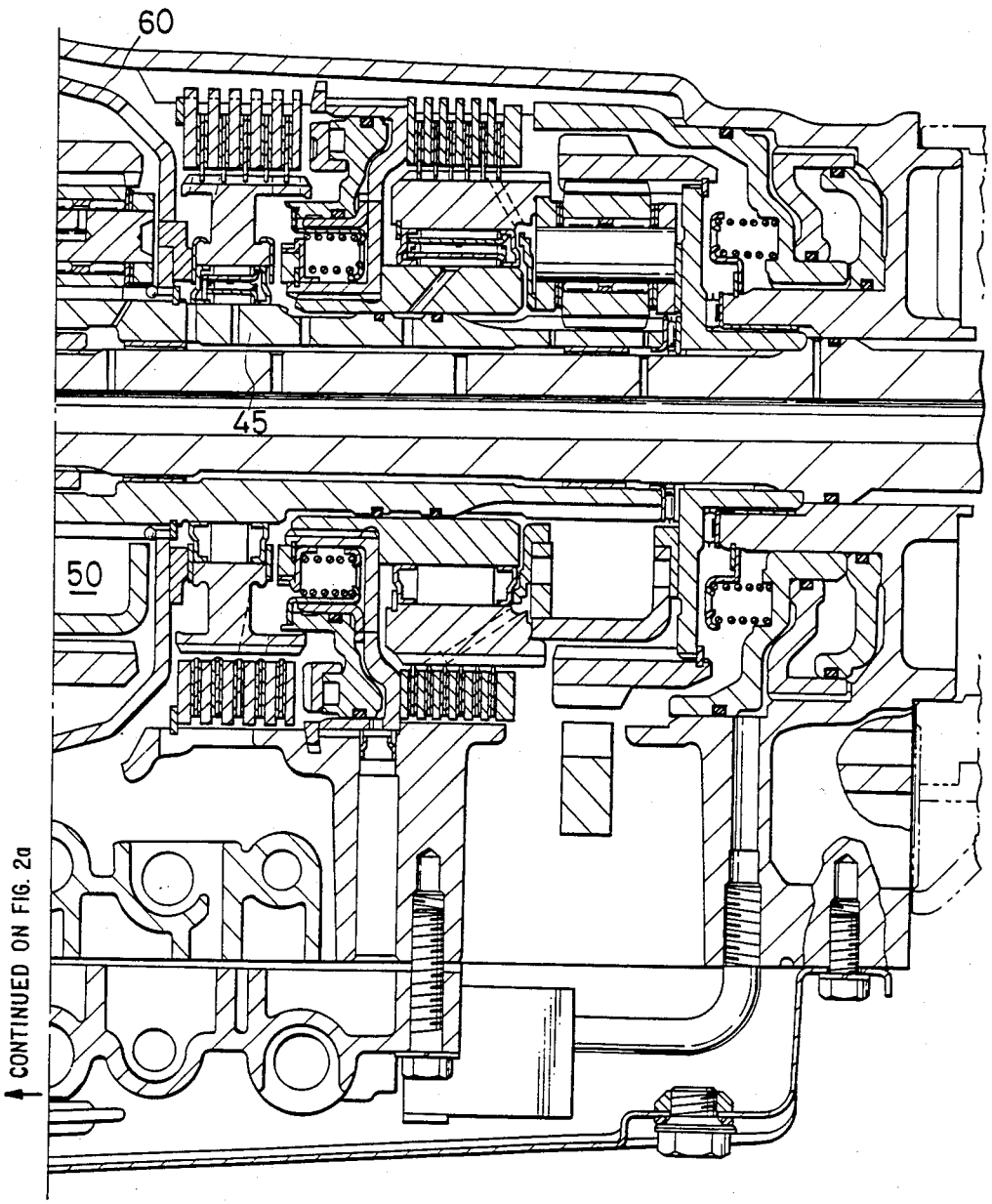

As illustrated in FIGS. 1, 2a and 2b, the hydraulic servo drum 1 according to the invention includes: an annular plate member 2 rotatably mounted on a center support 158 and having a cylindrical portion 2b extending axially from its outer periphery 2a, and an inner peripheral wall 2c extending in the rightward direction in the drawing and provided with a radial line pressure supply hole 2d, a lubricant oil hole 2e for supplying a lubricant oil to return springs 44 of a piston 42 and so forth and a ring groove 2i for stopping therein a ring 2h which in turn stops a retainer ring 2g for the return springs 44; an intermediate cylinder member 3 having one end 3a thereof fitted on the cylindrical portion 2b, splined in intermediate portions 3b with clutch plates 3c which serve as friction elements for the clutch C2, and having a ring groove 3f formed at the other end 3d thereof for receiving a ring 3e therein; and an outer cylinder member 4 having a folded portion 4b formed at one end 4a by press-forming, having the inner periphery 4c of the folded portion 4b connected to the outer periphery 3h of one end of the intermediate cylinder member 3, coupled with a sun gear shaft 45 through a connecting drum 60 on the right side of a second planetary gear set 50, and provided with a belt brake B1 on the outer periphery 4d thereof. For assembling these parts together, the cylindrical portion 2b of the annular plate member 2, one end 3a of the intermediate cylinder member 3 and the folded portion 4b of the outer cylinder member 4 are overlapped one on another and the overlapped portions 5 are joined together by at least one welding operation.

Figure 3A:
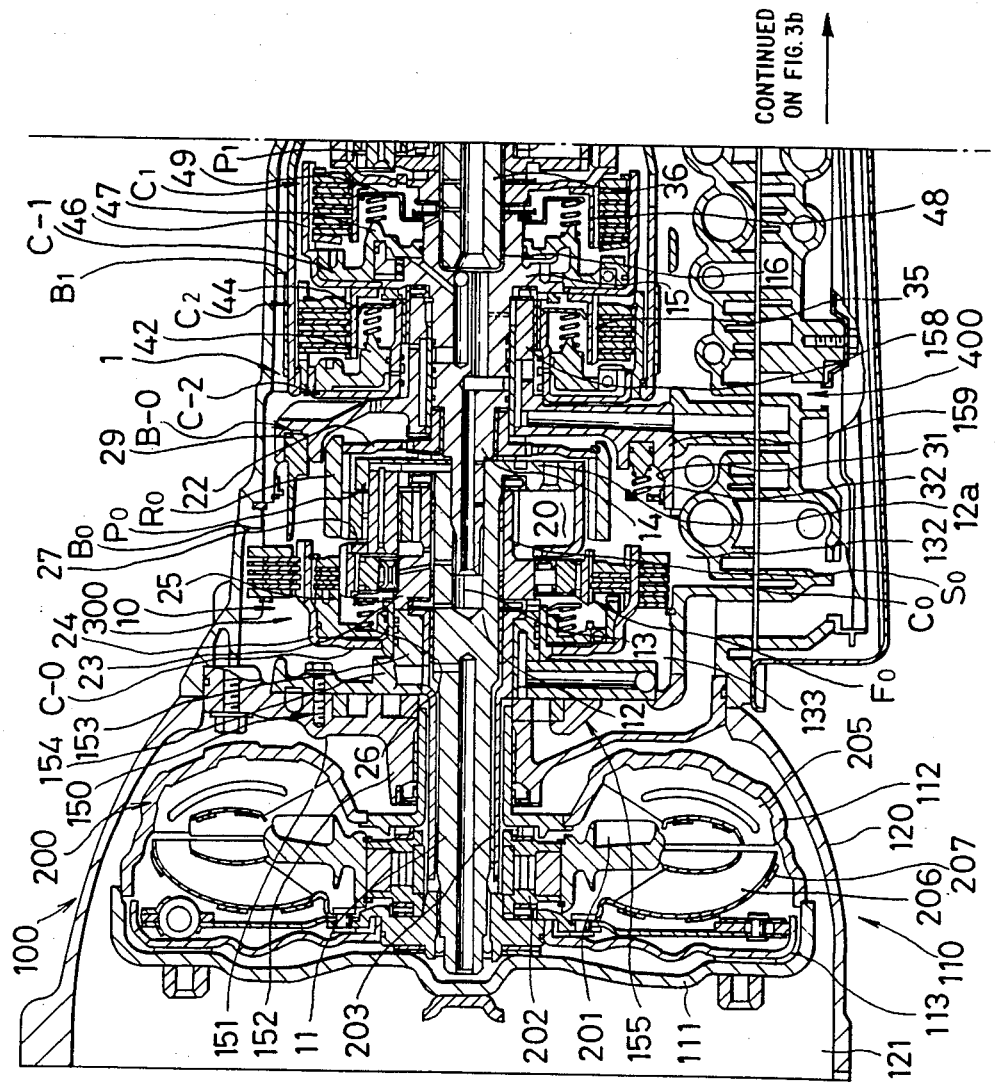
FIGS. 3a and 3b are sectional views of the left and right half, respectively, of the vehicular automatic transmission incorporating the hydraulic servo drum of the invention.
Figure 3B:
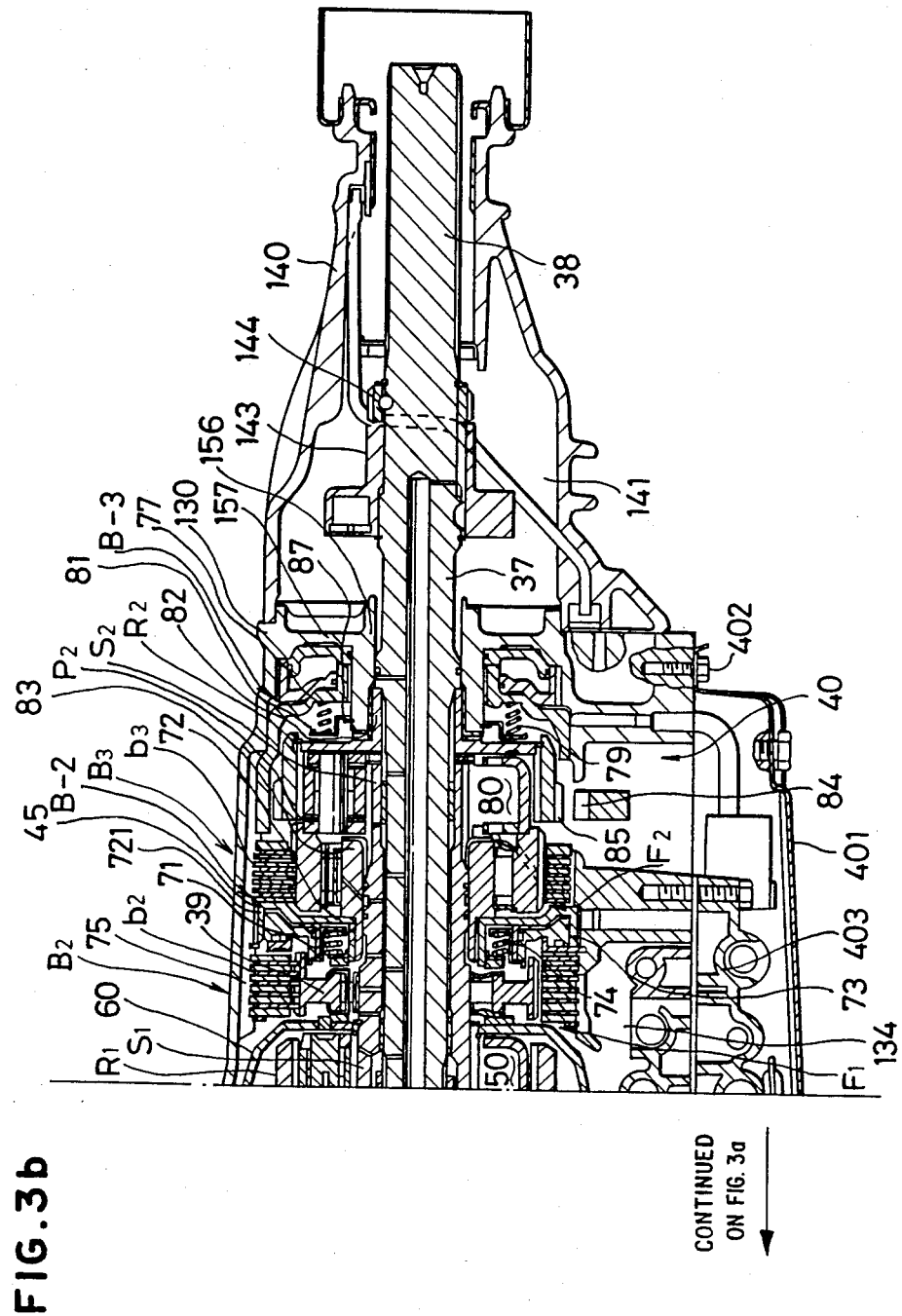

Referring now to FIGS. 3a and 3b, there is shown a vehicular automatic transmission incorporating the hydraulic servo drum of the invention for a friction clutch. The automatic transmission which is generally designated at 100 includes a fluid coupling 200 (a torque converter in the particular embodiment shown), a transmission 300, and a hydraulic control system 400.

The transmission 300 consists of: an overdrive planetary gear transmission 10 including a first planetary gear set 20, and multiple disk clutch C0, a multiple disk brake B0 and a one-way clutch F0 which are operated by hydraulic servos; and an underdrive planetary gear transmission with three forward speed and one reverse speed ranges, including a second planetary gear set 50, a third planetary gear set 80, and two multiple disk clutches C1 and C2, a belt brake B1, two multiple disk brakes B2 and B3, and two one-way clutches F1 and F2 which are operated by hydraulic servos.

The case 110 of the automatic transmission 100 includes: a torque converter housing 120 accommodating a torque converter 200; a transmission case 130 accommodating in series the overdrive planetary gear transmission and the underdrive planetary gear transmission; and an extension housing 140 covering the rear side of the automatic transmission 100. These torque converter housing 120, transmission case 130 and extension housing 140 are fastened together by a number of bolts.

The torque converter 200 is received in a torque converter room 121 of the torque converter housing 120, which is open on the front side (on the side of the engine), and includes: a front cover 111 coupled with the output shaft of the engine; a rear cover 112 in the form of an annular plate welded at its outer periphery to the front cover 111; a pump impeller 205 provided on the inner wall around the inner periphery of the rear cover 112; a turbine runner 206 provided opposingly to the pump impeller 205; a turbine shell 207 retaining the turbine runner 206; a stator 201 supported on a fixed shaft 203 through a one-way clutch 202; and a direct coupling clutch (lock-up clutch)113 for directly coupling the front cover 111 with the turbine shell 207. Mounted between the torque converter room 121 and a cylindrical transmission room 132 of the transmission case 130 ensuing on the rear side of the converter room 121 is a gear type oil pump 150 and an annular oil pump casing 151 which is centrally provided with a forwardly extending cylindrical portion 152 and fastened to the front end face of the transmission case 130 through a spigot fit. Fastened to the rear side of the oil pump body 151 is an oil pump cover 154 with a rearwardly extending cylindrical front support 153 in coaxial relation with the afore-mentioned cylindrical portion 152. The oil pump casing 151 and oil pump cover 154 form an oil pump housing 155 which serves as a partition wall between the torque converter room 121 and the transmission room 132 and also as a front support wall for the transmission 300. Provided at a median position in the transmission room 132 of the transmission case 130 is an intermediate support wall 159 which is formed separately by casting, the intemediate support wall 159 partitioning the overdrive room 133 and the underdrive room 134 and being provided with a rearwardly extending cylindrical center support 158.

In a rear portion of the transmission case 130, a rear support wall 157 with a rearwardly extending cylindrical rear support 156 is formed integrally with the transmission case 130. Formed between the oil pump casing (the front support wall or partition wall) 155 and the rear support wall 157 is the transmission room 132 which receives the transmission 300, and formed between the rear support wall 157 and the extension housing 140 is an output shaft chamber 141 of the transmission. An electronically controlled sensor rotor 143 and a speedometer drive gear 144 are provided in the extension housing 140, and a sleeve yoke which is not shown is inserted in its rear end portion and coupled with a propeller shaft (not shown) in coaxial relation with the front support 153.

Rotatably supported in the front support 153, on the inner side of the fixed shaft 203, is an input shaft 11 of the transmission, which serves also as the output shaft of the torque converter 200. This input shaft 11 is formed in a larger diameter in its rear end portion 12 which is protruded rearward from the front support 11 and provided with a flange portion 12a, the rear end portion 12 being provided with a center hole 13 along its axis. An intermediate transmission shaft 14 is mounted rotatably in a position rearward of the input shaft 11 in series and coaxial relation therewith. The intermediate transmission shaft 14 is fitted in the center hole 13 at its fore end which is rotatable in sliding contact with the inner peripheral wall of the center hole 13 through a metal bearing, and formed in a larger diameter in its rear end portion 15 which is provided with a rearwardly open center hole 16 along the axis thereof. An output shaft 36 is rotatably mounted rearward of and in series with the intermediate transmission shaft 14. This output shaft 36 is fitted in the center hole 16 at its fore end which is in sliding contact with the inner wall of the center hole 16 through a metal bearing. The output shaft 36 is splined in its intermediate portion 37 to a flange plate 82 with a rearwardly projecting shaft portion 81 in meshing engagement with the ring gear R2 of the third planetary gear set 80, and in its rear portion 38 to the aforementioned sleeve yoke, fixedly mounting the sensor rotor 143 and speedometer drive gear 144 in the output shaft room 141.

The first planetary gear set 20 is mounted rearward of the input shaft 11 in the overdrive room 133, having a ring gear R0 coupled with the intermediate transmission shaft 14 through the flange plate 22, a planetary carrier P0 coupled with the flange portion 12a of the input shaft 11 and a sun gear S0 formed on the inner race shaft 23. A rearwardly opened first hydraulic servo drum 24 is fixedly mounted on the inner race shaft 23 on the front side of the first planetary gear set 20, and an annular piston 25 is fitted between the outer peripheral wall of the drum and the inner race shaft 23 to form a hydraulic servo C-0 for the clutch C0, mounting a return spring 26 on the side of the inner race shaft 23 and the clutch C0 on the inner side of the outer peripheral wall and coupling with the planetary carrier P0 through the clutch C0. A one-way clutch F0 having the inner race shaft 23 as its inner race is provided on the inner periphery of the first hydraulic servo drum 24 and, between an outer race 27 on its outer periphery and the transmission case 130, the clutch C0 and brake B0 are provided. A piston 29 is fitted in the front side of the center support wall 159 to form a hydraulic servo B-0 for the brake B0, and a return spring 32 is fitted in the inner periphery 31 of a fore end portion 31 of the intermediate support wall 159.

A rearwardly opened second hydraulic servo drum 1 is rotatably fitted on the center support 159 in a front portion of the underdrive room 134, and an annular piston 42 is fitted between its cylindrical portion 2b and inner peripheral wall 2c to form a hydraulic servo C-2 for the clutch C2, mounting a return spring 44 on the side of the inner peripheral wall and the clutch C2 on the side of the outer peripheral wall. Behind the second hydraulic servo drum 41, a rearwardly opened third hydraulic servo drum 46 with an annular projection 35 on its front side is fixedly mounted on a rear end portion 15 of the intermediate transmission shaft 14. An annular piston 47 is fitted between the just-mentioned rear end portion 15 and the outer peripheral wall to form a hydraulic servo C-1 for the clutch C1, mounting a return spring 49 on the inner peripheral side of the clutch C1 and mounting the clutch C2 on the outer periphery of the annular projection 35. The second and third hydraulic servo drums 41 and 46 are coupled through the clutch C2. Provided behind the third hydraulic servo drum 46 is the second planetary gear set 50 having its ring gear R1 coupled with the third hydraulic servo drum 46 through the annular projection 48 and clutch C1, a planetary carrier P1 splined on a fore end portion of the output shaft 36, and a sun gear S1 formed integrally with the sun gear shaft 45. A connecting drum 60 which is so shaped as to cover the second and third hydraulic drums 41 and 46 and the second planetary gear set 50 in a minimum space is fixed at its fore end to the outer periphery of the second hydraulic servo drum 41, and connected at its rear end to the sun gear shaft 45 at a position behind the second planetary gear set 50, with a belt brake B1 on the outer periphery thereof.

Brake disks b2 of the brake B2, outer spline 725 of a fourth hydraulic servo drum 72 and brake disks b3 of the brake B3 are fitted from the front side in spline 75 which is formed on the inner side of the transmission case 130 behind the brake B2, and a piston 77 is fitted in an annular hole between the outer periphery of the rear support 156 of the rear support wall 157 and the transmission case 130 to form a hydraulic servo B-3 for the brake B3, supporting the return spring 79 of the hydraulic servo B-3 by a retainer 87 which is mounted at the fore end of the rear support 156.

The third planetary gear set 80 includes a sun gear S2 formed integrally with the sun gear shaft 45, a planetary carrier P2 coupled with the outer race 86 of the one-way clutch F2 on the front side and with the brake B3, and a ring gear R2 having a parking gear 85 provided around the circumference thereof and connected to an intermediate portion 37 of the output shaft 36. The parking gear 85 fixes the output shaft 36 by meshing with a parking pawl 84 when the shiftlever of the automatic transmission is set in the parking (P) position.

One-way clutch F1 which has the sun gear shaft 45 as its inner race is provided on the inner side of the brake B2, with the outer race thereof connected to the brake B2. Mounted behind the one-way clutch F1 is a one-way clutch F2 which has inner race 83 splined with a fourth hydraulic servo drum which will be described hereinbelow. A forwardly opened annular fourth hydraulic servo drum 72 is mounted in an extra space behind the connecting drum 60 on the outer side of the second planetary gear set 50. A press-formed intermediate cylinder member 71 is projected forward from a predetermined position on the fourth hydraulic servo drum 72 and joined to the latter by welding to prevent oil pressure from the hydraulic servo. An annular piston 73 is fitted between the outer peripheral wall 721 of the fourth hydraulic servo drum 72 and the intermediate cylinder member 71, and return springs 74 are mounted between the inner peripheral wall of the fourth hydraulic servo drum 72 and the intermediate cylinder member 71, forming a hydraulic servo B-2 of the brake B2 by the fourth hydraulic servo drum 72 and piston 73. The brake B2 is mounted on the inner side of the outer peripheral wall. The intermediate cylinder member 71 has a diameter which defines an optimum area for the piston 73.

The transmission 300 engages or releases the respective clutches and brakes by the oil pressure which is selectively supplied to the hydraulic servoes of the friction coupling elements according to the vehicle speed, throttle opening or other operating conditions of the vehicle by the hydraulic control system 400 in a valve casing 403 in an oil pan 401 which is fastened to the lower side of the transmission case 130 by bolts 402, thereby effecting shifts to and from four forward and one reverse speed ranges. Table 1 below shows one example of speed ranges established by engagement and release of the respective clutches, brakes and one-way clutches.

TABLE 1

| RANGES | | Clutches | | | Brakes | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |
|   | 2 | E | E | X | X | X | E | X | (L) | L | f |
|   | 3 | E | E | E | X | X | E | X | (L) | f | f |
|   | 4 | X | E | E | E | X | E | X | f | f | f |
| S | 1 | E | E | X | X | X | X | X | (L) | f | L |
|   | 2 | E | E | X | X | E | E | X | (L) | (L) | f |
|   | 3 | E | E | E | X | X | E | X | (L) | f | f |
| L | 1 | E | E | X | X | X | X | E | (L) | f | (L) |
|   | 2 | E | E | X | X | E | E | X | (L) | (L) | f |

In Table 1, the letter "E" indicates an engaged state of the corresponding clutch or brake, and "L" indicates that the corresponding one-way clutch is engaged only in engine-drive operation and not in engine-brake operation. Further, the letter "(L)" indicates a "locked" state in which the corresponding one-way clutch is engaged in engine-drive operation but its engagement is not necessarily required since the power is delivered by a parallel mounted clutch or brake. The small letter "f" indicates a free state of the corresponding one-way clutch, and the cross "X" indicates a released state of the corresponding clutch or brake.

What is claimed is:

1. A hydraulic servo drum-and-piston assembly for a friction clutch, comprising:
   an annular plate member having a press-formed cylindrical portio around the outer periphery thereof and an inner peripheral wall; said cylindrical portion and said inner peripheral wall together defining an annular space;
   an annular piston fitting into said annular space and slidingly and sealingly engaging said cylindrical portion and said inner peripheral wall of said annular plate member;
   an intermediate cylinder member having one end thereof fitted on said cylindrical portion and formed with a spline in the remaining portions thereof; and an outer cylinder member formed into a cylindrical shape by press-forming and having a folded portion at one end thereof, which folded portion having the inner periphery thereof connected to said intermediate cylinder member.

2. A hydraulic servo drum-and-piston assembly for a friction clutch as defined in claim 1, wherein
said annular plate member, intermediate cylinder member and outer cylinder member overlap one on another and are welded together at one meeting end thereof.

* * * * *